(12) United States Patent
Feng et al.

(10) Patent No.: US 10,210,122 B2
(45) Date of Patent: Feb. 19, 2019

(54) INTERFACE CIRCUIT, METHOD AND DEVICE FOR STATE SWITCHING

(71) Applicant: Xiaomi Inc., Beijing (CN)

(72) Inventors: Wei Feng, Beijing (CN); Jun Tao, Beijing (CN); Guosheng Li, Beijing (CN)

(73) Assignee: Xiaomi Inc., Beijing (CN)

(*) Notice: Subject to any disclaimer, the term of this patent is extended or adjusted under 35 U.S.C. 154(b) by 155 days.

(21) Appl. No.: 15/064,350

(22) Filed: Mar. 8, 2016

(65) Prior Publication Data
US 2017/0039155 A1    Feb. 9, 2017

(30) Foreign Application Priority Data

Aug. 7, 2015  (CN) .......................... 2015 1 0483712

(51) Int. Cl.
*G06F 13/40* (2006.01)
*G06F 13/42* (2006.01)
(Continued)

(52) U.S. Cl.
CPC .......... *G06F 13/4022* (2013.01); *G06F 1/266* (2013.01); *G06F 1/3287* (2013.01);
(Continued)

(58) Field of Classification Search
CPC ..................................................... G06F 13/38
See application file for complete search history.

(56) References Cited

U.S. PATENT DOCUMENTS 6,510,524 B1   1/2003 Osborn et al.
8,447,890 B1   5/2013 Letourneur et al.
(Continued)

FOREIGN PATENT DOCUMENTS

CN    101359316 A    2/2009
CN    101901201 A    12/2010
(Continued)

OTHER PUBLICATIONS

Notice of Allowance dated Jun. 13, 2017 in Russian Patent Application No. 2016106934.
(Continued)

*Primary Examiner* — Henry Tsai
*Assistant Examiner* — Juanito Borromeo
(74) *Attorney, Agent, or Firm* — Oblon, McClelland, Maier & Neustadt, L.L.P.

(57) ABSTRACT

The disclosure relates to an interface circuit, method and device for state switching and belongs to the terminal technology field. Aspects of the disclosure provide a circuit for switching a device between a master state and a slave state. The circuit includes a first interface configured to couple the circuit with internal circuits of the device, a second interface configured to couple the circuit with a connector structure that is configured to couple the device with another device that is external to the device and control circuits configured to provide a first signal to the internal circuits via the first interface to switch the internal circuits from a first state to a second state, and provide a second signal via the second interface to the other device to switch the other device from the second state to the first state.

11 Claims, 4 Drawing Sheets

(51) Int. Cl.
*G06F 13/38* (2006.01)
*G06F 13/364* (2006.01)
*G06F 1/26* (2006.01)

(52) U.S. Cl.
CPC .......... *G06F 13/364* (2013.01); *G06F 13/385* (2013.01); *G06F 13/4282* (2013.01)

(56) References Cited

U.S. PATENT DOCUMENTS

| | | |
|---|---|---|
| 2003/0030412 A1 | 2/2003 | Matsuda et al. |
| 2008/0150512 A1 | 6/2008 | Kawano |
| 2011/0029703 A1* | 2/2011 | Huo .................... G06F 13/4068 710/110 |
| 2012/0030485 A1 | 2/2012 | Kawano |
| 2012/0231857 A1* | 9/2012 | Hsu ....................... H04M 19/08 455/573 |
| 2012/0254638 A1 | 10/2012 | Kawano |
| 2014/0365695 A1 | 12/2014 | Peng et al. |

FOREIGN PATENT DOCUMENTS

| | | |
|---|---|---|
| CN | 102684236 A | 9/2012 |
| CN | 103942169 A | 7/2014 |
| CN | 104239240 A | 12/2014 |
| CN | 204044810 U | 12/2014 |
| JP | 2002-258999 A | 9/2002 |
| JP | 2003-61256 A | 2/2003 |
| JP | 2005-287278 A | 10/2005 |
| JP | 2006-99354 A | 4/2006 |
| JP | 3959374 B2 | 5/2007 |
| JP | 2015-505401 A | 2/2015 |
| JP | 2017-524210 A | 8/2017 |
| KR | 10-0700532 B1 | 3/2007 |
| KR | 10-2013-0076706 A | 7/2013 |
| RU | 2 498 476 C1 | 11/2013 |
| WO | WO 2014/006619 A1 | 1/2014 |
| WO | 2015/184994 A1 | 12/2015 |

OTHER PUBLICATIONS

Korean Office Action dated Jul. 17, 2017 in Korean Patent Application No. 10-2016-7004830.
International Search Report dated Apr. 27, 2016 in PCT/CN2015/098944.
Extended European Search Report dated Jan. 19, 2017 in Patent Application No. 16159683.8.
Combined Russian Office Action and Search Report dated Jan. 27, 2017 in Russian Patent Application No. 2016106934.
Notice of Allowance dated Jun. 13, 2017 in Russian Patent Application No. 21606934/12
Japanese Notice of Allowance issued in Japanese Patent Application No. 2017-533681 dated Sep. 27, 2017.
Korean Notice of Allowance issued in Korean Application No. 10-2016-7004830 dated May 31, 2018 (w/ English translation).
Chinese Office Action issued in Chinese Application No. 201510483712.8 dated Oct. 19, 2018.

\* cited by examiner

INTERFACE CIRCUIT, METHOD AND DEVICE FOR STATE SWITCHING

CROSS-REFERENCE TO RELATED APPLICATIONS

This application is based upon and claims priority to Chinese Patent Application No. 201510483712.8, filed on Aug. 7, 2015, the entire contents of which are incorporated herein by reference.

FIELD

The present disclosure generally relates to terminal technology field, and more particularly, to an interface circuit, method and device for state switching.

BACKGROUND

With development of USB (Universal Serial Bus) interface technology, a user can use a connection line to connect the USB interfaces of two terminals, achieving data interaction or power transfer between terminals.

After connecting two terminals with the connection line, the master device of the two terminals can read/write data form/to the slave device through the connection line, while the slave device cannot read/write data form/to the master device. After connecting two terminals with the connection line, the master and slave states of the two terminals are random and cannot be switched, which is not good for data interaction between the terminals.

SUMMARY

Embodiments of the present disclosure provide an interface circuit, method and device for state switching, and technical solutions are as follows.

Aspects of the disclosure provide a circuit for switching a device between a master state and a slave state. The circuit includes a first interface configured to couple the circuit with internal circuits of the device, a second interface configured to couple the circuit with a connector structure that is configured to couple the device with another device that is external to the device and control circuits configured to provide a first signal to the internal circuits via the first interface to switch the internal circuits from a first state to a second state, and provide a second signal via the second interface to the other device to switch the other device from the second state to the first state.

According to an aspect of the disclosure, the first interface includes a first plurality of pins configured to couple the circuit with a power management circuit in the device, the second interface includes a second plurality of pins corresponding to the first plurality of pins, the second plurality of pins are configured to couple the device with the other device, and the control circuits are configured to disconnect the first plurality of pins from the corresponding second plurality of pins at a time to switch the internal circuits from the first state to the second state.

Further, the first interface includes a third plurality of pins configured to couple the circuit with a data bus control circuit in the device, the second interface includes a fourth plurality of pins corresponding to the third plurality of pins, the fourth plurality of pins are configured to couple the device with the other device, and the control circuits are configured to disconnect the third plurality of pins from the corresponding fourth plurality of pins at the time to switch the internal circuits from the first state to the second state. In an example, the control circuits are configured to connect corresponding pins in the first interface and the second interface after the internal circuits enter the second state.

In an embodiment, the first plurality of pins includes a first pin configured to provide the first signal to the power management circuit to cause the power management circuit to change an operation state, the second plurality of pins includes a second pin configured to provide the second signal to the other device to switch the other device from the second state to the first state.

According to an aspect of the disclosure, the first interface includes a control pin configured to receive a control signal from the internal circuits that is generated in response to an user instruction to switch state, and the control circuits are configured to provide, in response to the control signal, the first signal to the internal circuits via the first interface to switch the internal circuits from the first state to the second state, and provide, in response to the control signal, the second signal to the other device to switch the other device from the second state to the first state.

In an example, the second interface is configured to couple the circuit with the connector structure that is configured to couple the device with the other device according to a Universal Serial Bus (USB) standard.

Aspects of the disclosure provide a method for switching a device between a master state and a slave state. The method includes receiving, at a circuit, a control signal that is generated in response to an user instruction to switch state, providing a first signal, in response to the control signal, via a first interface to internal circuits of the device to switch the internal circuits from a first state to a second state, and providing a second signal, in response to the control signal, via a second interface to a connector structure that is configured to couple the device with another device that is external to the device to switch the other device from the second state to the first state.

It is to be understood that both the foregoing general description and the following detailed description are exemplary and explanatory only and are not restrictive of the disclosure, as claimed.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

Although the explicit embodiments of the present disclosure have been shown by the above accompanying drawings, the detailed description will be provided below. These drawings and description are to explain the concept of the present disclosure for the skilled in the art by reference to particular embodiments, not to restrict the scope of the present disclosure in any ways,

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of devices and methods consistent with aspects related to the disclosure as recited in the appended claims.

Figure 1:
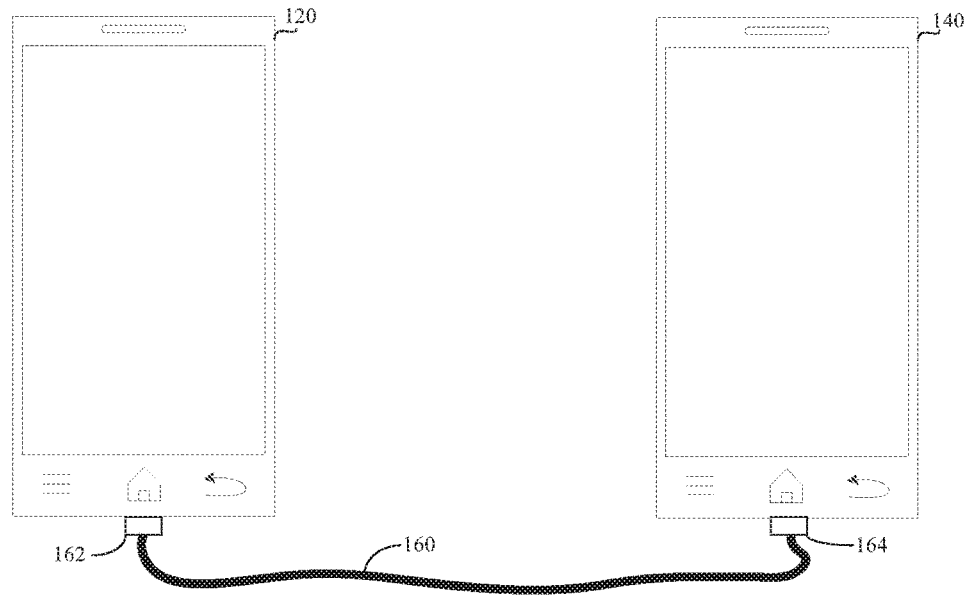
FIG. 1 is a structure diagram of an implementation environment involved in various embodiments of the present disclosure.

Referring to FIG. 1, which shows a structure diagram of an implementation environment involved in various embodiments of the present disclosure. The implementation environment includes a first terminal 120, a second terminal 140 and a connection line 160.

The first terminal 120 and the second terminal 140 may be a smart phone, a tablet computer, an ebook reader, a MP3 (Moving Picture Experts Group Audio Layer III) player, a MP4 (Moving Picture Experts Group Audio Layer IV) player, a portable laptop computer and the like. In FIG. 1, the first terminal 120 and the second terminal 140 are both smart phones.

The first terminal 120 is connected with the second terminal 140 through the connection line 160.

The first terminal 120 and the second terminal 140 are both installed with an interface circuit (not shown) which includes a USB interface. When the first terminal 120 is connected with the second terminal 140 with the connection line 160, a first joint 162 of the connection line 160 is connected with the USB interface of the first terminal 120 and a second joint 164 of the connection line 160 is connected with the USB interface of the second terminal 140.

The first joint 162 of the connection line 160 matches the USB interface of the first terminal 120, and the second joint 164 of the connection line 160 matches the USB interface of the second terminal 140. For example, when the USB interfaces of the first terminal 120 and the second terminal 140 are both Type C interfaces, the connection line 160 is a Type C connection line, the first joint 162 and the second joint 164 of which are both Type C joints.

In the first terminal 120 and the second terminal 140 connected through the connection line 160, one is a master device and the other one is a slave device. Usually, in connected terminals, the slave device is charged from the master device and the master device can read/write data from/to the slave device while the salve device cannot read/write data from/to the master device.

For convenience, in the following embodiments, descriptions are made by way of examples in which the first terminal 120 and the second terminal 140 are both smart phones, the USB interfaces on the first terminal 120 and the second terminal 140 are both Type C interfaces, and the connection line 160 is a Type C connection line, and the descriptions are not restrictive of the disclosure.

Figure 2A:
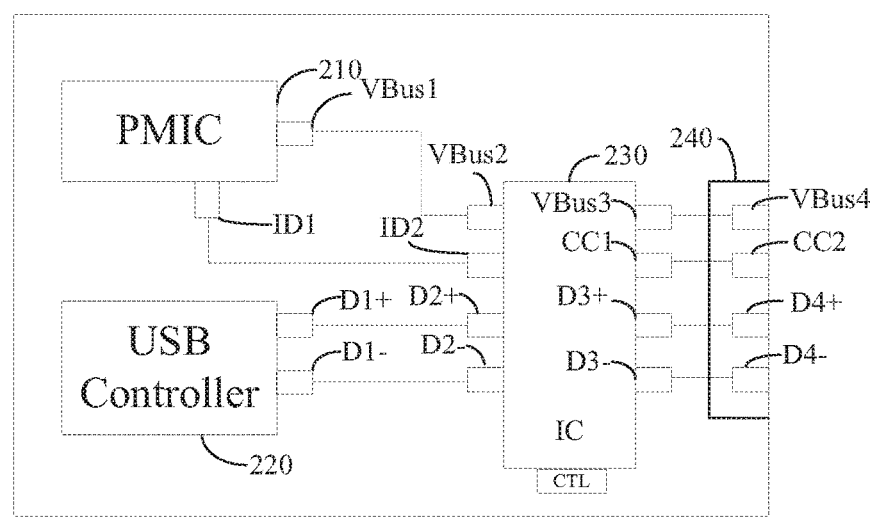
FIG. 2A is a structure diagram of an interface circuit, according to an exemplary embodiment.

FIG. 2A is a structure diagram of an interface circuit, according to an exemplary embodiment. The first terminal 120 and the second terminal 140 in FIG. 1 are both installed with the interface circuit as shown in FIG. 2A. The interface circuit includes: a PMIC 210, a USB controller 220, an IC 230 and a USB interface 240.

Wherein, the IC 230 is set between the PMIC 210 and the USB interface 240, and is electrically connected with the PMIC 210 and the USB interface 240, respectively; the IC 230 is set between the USB controller 220 and the USB interface 240, and is electrically connected with the USB controller 220 and the USB interface 240.

The PMIC 210 includes a first identity pin ID1 and a first voltage bus pin VBus1. Wherein, the first identity pin ID1 is used to identify master and slave states of the terminals. When the level of the first identity pin ID1 is high, the terminal is in a slave device state; when the level of the first identity pin ID1 is low, the terminal is in a master device state. The first voltage bus pin VBus1 is used to transfer power with an externally connected terminal. When the externally connected terminal is the master device, the first voltage bus pin VBus1 receives power transferred from the externally connected terminal through the connection line; when the externally connected terminal is the slave device, the first voltage bus pin VBus1 transfers power to the externally connected terminal through the connection line.

The USB controller 220 includes a first data plus pin D1+ and a first data-pin D1−. The USB controller 220 is used to transfer data with the externally connected terminal through the first data plus pin D1+ and the first data-pin D1−.

One side of the IC 230 is set with a second identity pin ID2, a second voltage bus pin VBus2, a second data plus pin D2+ and a second data-pin D2−. Correspondingly, the other side of the IC 230 is set with a first configuration channel pin CC1, a third voltage bus pin VBus3, a third data plus pin D3+ and a third data-pin D3−. The IC 230 controls connection or disconnection between the PMIC 210 and the USB interface 240 as well as between the USB controller 220 and the USB interface 240 by adjusting connection or disconnection between corresponding pins. Alternatively, The IC 230 further includes a control pin CTL which is connected with a processor in the terminal to receive state switching signals sent by the processor.

It needs to be noted that under a default state, the second identity pin ID2 is connected with the first configuration channel pin CC1, the second voltage bus pin VBus2 is connected with the third voltage bus pin VBus3, the second data plus pin D2+ is connected with the third data plus pin D3+, and the second data-pin D2− is connected with the third data-pin D3−, that is to say, the PMIC 210 is connected with the USB interface 240, and the USB controller 220 is connected with the USB interface 240. Wherein, the default state refers to non-switching state or switching-completed state.

The USB interface 240 includes a second configuration channel pin CC2, a fourth voltage bus pin VBus4, a fourth data plus pin D4+ and a fourth data-pin D4−. The USB interface 240 is used to be connected with the connection line, thus achieving power or data transfer between terminals.

As shown in FIG. 2A, in the interface circuit, the connections of the pins between the PMIC 210, the USB controller 220, the IC 230 and the USB interface 240 are as follows. The first identity pin ID1 of the PMIC 210 is connected with the second identity pin ID2 of the IC 230, and the first configuration channel pin CC1 of the IC 230 is connected with the second configuration channel pin CC2 in the USB interface 240.

In order to enable the connected terminals to determine the master and slave states of the terminals according to the levels of the ID pins, under the default state, the IC 230 connects the second identity pin ID2 with the first configuration channel pin CC1, that is to say, the first identity pin ID1 of the PMIC 210 is connected with the second configuration channel pin CC2 in the USB interface 240. Meanwhile, the level signal at the first identity pin ID1 may be transmitted to the externally connected terminal through the second configuration channel pin CC2.

The first voltage bus pin VBus1 of the PMIC 210 is connected with the second voltage bus pin VBus2 of the IC 230, and the third voltage bus pin VBus3 of the IC 230 is connected with the fourth voltage bus pin VBus4 of the USB interface 240.

In order to ensure that the connected terminals are able to transfer power therebetween, under the default state, the IC 230 connects the second voltage bus pin VBus2 with the third voltage bus pin VBus3, that is to say, the first voltage bus pin VBus1 of the PMIC 210 is connected with the fourth voltage bus pin VBus4 of the USB interface 240.

The data pin in the USB controller 220 is connected with the data pin in the USB interface 240 through the IC 230.

As shown in FIG. 2A, the first data plus pin D1+ of the USB controller 220 is connected with the second data plus pin D2+ of the IC 230, the third data plus pin D3+ of the IC 230 is connected with the fourth data plus pin D4+ of the USB interface 240; the first data-pin D1− of the USB controller 220 is connected with the second data-pin D2− of the IC 230, the third data-pin D3− of the IC 230 is connected with the fourth data-pin D4− of the USB interface 240.

In order to ensure that the connected terminals are able to transfer data therebetween, under default state, the IC 230 connects the second data plus pin D2+ with the third data plus pin D3+ and connects the second data-pin D2− with the third data-pin D3−, that is to say, the first data plus pin D1+ of the USB controller 220 is connected with the fourth data plus pin D4+ of the USB interface 240 and the first data-pin D1− of the USB controller 220 is connected with the fourth data-pin D4− of the USB interface 240.

Figure 2B:
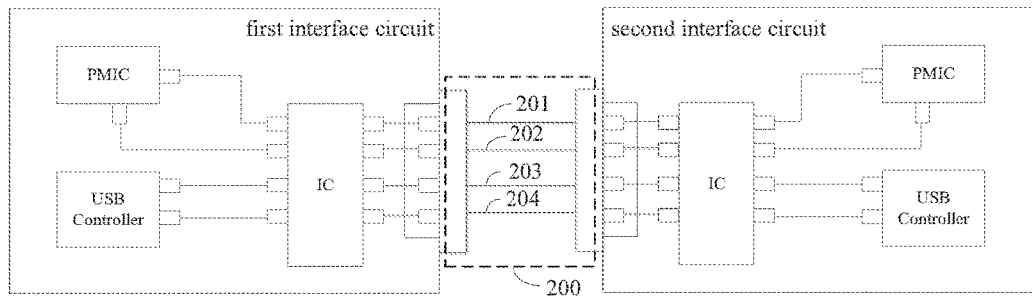
FIG. 2B is a connection diagram of two interface circuits, according to an exemplary embodiment.

As shown in FIG. 2B, a first interface circuit and a second interface circuit both employ an interface circuit as shown in FIG. 2A, and use connection lines 200 to be connected. The connection lines 200 include a VBus channel 201, a CC channel 202, a D+ channel 203 and a D− channel 204.

Wherein, the VBus channel 201 is used to transfer data or signals sent by the VBus pin in the USB interface; the CC channel 202 is used to transfer data or signals sent by the CC pin in the USB interface; the D+ channel 203 is used to transfer data or signals sent by the D+ pin in the USB interface; the D− channel 204 is used to transfer data or signals sent by the D− pin in the USB interface. It needs to be noted that the connection lines 200 may also include other common channels. This embodiment only provides an exemplary description with the above-mentioned four channels and is not restrictive of the disclosure.

A terminal installed with the above-mentioned interface circuit may send corresponding state switching instructions to the interface circuit on actual demand. The interface circuit may dynamically switch the master and slave states according to the state switching instructions.

Under a master-slave switching state, the IC 230 disconnects the second identity pin ID2 with the first configuration channel pin CC1, and sets the second identity pin ID2 to high level and the first configuration channel pin CC1 to low level.

Wherein, the master-slave switching state refers to a state of switching from the master device to the slave device. Under the master-slave switching state, because the second identity pin ID2 is at high level and the second identity pin ID2 is connected with the first identity pin ID1 of the PMIC 210, the first identity pin ID1 can receive a high level signal from the second identity pin ID2, that is to say, the PMIC 210 knows the current terminal is the slave device. Meanwhile, the first configuration channel pin CC1 sends a low level signal to the PMIC of another terminal through the second configuration channel pin CC2 of the USB interface 240, so that the another terminal knows the current terminal is the master device.

Under a slave-master switching state, the IC disconnects the second identity pin ID2 with the first configuration channel pin CC1, and sets the second identity pin ID2 to low level and the first configuration channel pin CC1 to high level.

Wherein, the slave-master switching state refers to a state of switching from the slave device to the master device. Under the slave-master switching state, because the second identity pin ID2 is at low level and the second identity pin ID2 is connected with the first identity pin ID1 of the PMIC 210, the first identity pin ID1 can receive a low level signal from the second identity pin ID2, that is to say, the PMIC 210 knows the current terminal is the master device. Meanwhile, the first configuration channel pin CC1 sends a high level signal to the PMIC of another terminal through the second configuration channel pin CC2 of the USB interface 240, so that the another terminal knows the current terminal is the slave device.

Because after state switching, the master and slave states of the terminals will change, leading to a change in the direction of power or data transfer between the terminals. In order to avoid a waste in the power transfer or a exception in the data transfer, under the master-slave switching state or the slave-master switching state, the IC 230 disconnects the second data plus pin D2+ with the third data plus pin D3+, disconnects the second data-pin D2− with the third data-pin D3−, and disconnects the second voltage bus pin VBus2 with the third voltage bus pin VBus3, as a possible implementation.

under the master-slave switching state or the slave-master switching state, because the second data plus pin D2+ is disconnected with the third data plus pin D3+ and the second data-pin D2− is disconnected with the third data-pin D3−, the data transfer is interrupted between the terminals and the data cannot be transferred. Also, because the second voltage bus pin VBus2 is disconnected with the third voltage bus pin VBus3, the power cannot be transferred between the terminals, either.

In order to ensure that the data and power can recover normal transfer in a non-switching state or when a switching is complete, under the non-switching state, the IC 230 is in a state that the second identity pin ID2 is connected with the first configuration channel pin CC1, the second data plus pin D2+ is connected with the third data plus pin D3+, and the second data-pin D2− is connected with the third data-pin D3−, and the second voltage bus pin VBus2 is connected with the third voltage bus pin VBus3.

Figure 3A:
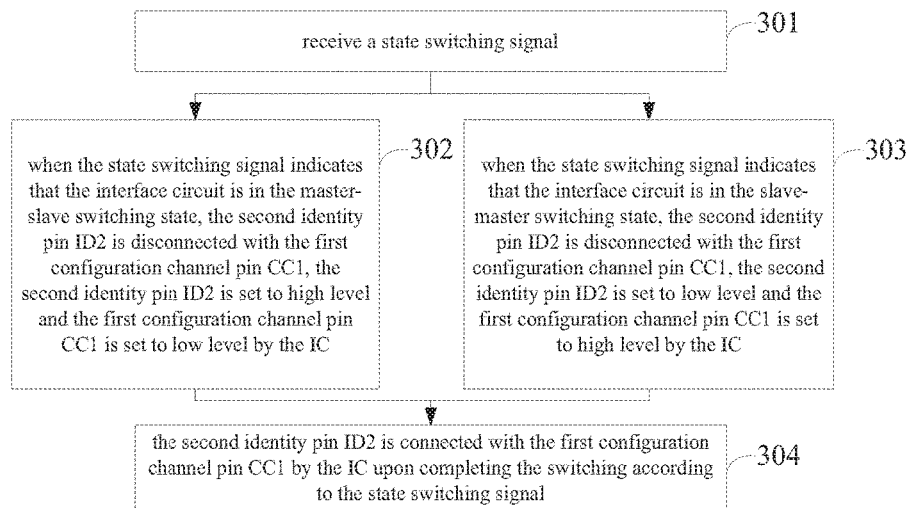
FIG. 3A is a method flowchart of a method for state switching, according to an exemplary embodiment.

FIG. 3A is a method flowchart of a method for state switching, according to an exemplary embodiment. This embodiment takes it as an example that this state switching method being used to the interface circuit as shown in FIG. 2A. The method includes receiving a state switching signal in step 301.

A terminal installed with the interface circuit as shown in FIG. 2A may switch from the master device to the slave device or from the slave device to the master device on actual demand. A pre-installed control software in the terminal may receive a state switching request triggered by the user. Upon receiving the state switching request, the terminal sends corresponding state switching signal to the IC in the interface circuit through a processor. Accordingly, the IC in the interface circuit receives the state switching signal. Wherein, different state switching signals indicate that the interface circuit enters different switching states. The correspondence of the state switching signals and the switching states can be exemplarily shown in Table. 1.

TABLE 1

| state switching signal | switching state |
|---|---|
| master-slave switching signal | master-slave switching state |
| slave-master switching signal | slave-master switching state |

Figure 3B:
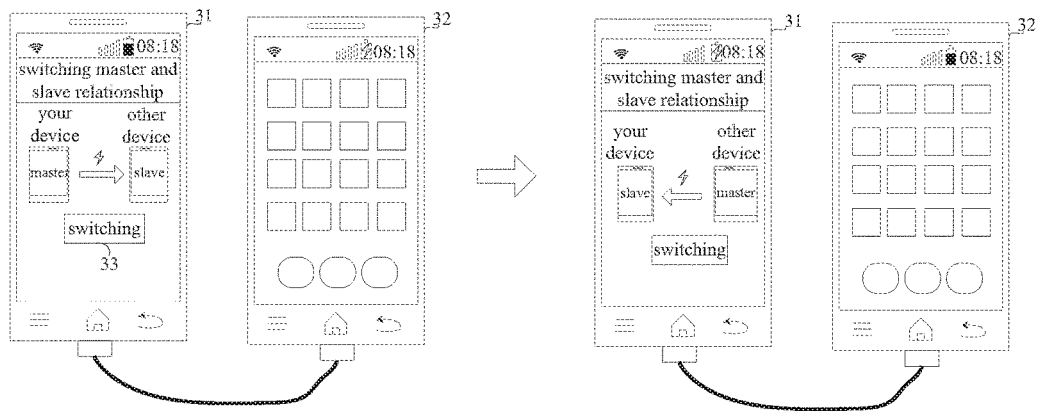
FIG. 3B is an implementation diagram of the method for state switching as shown in FIG. 3A.

For example, as shown in FIG. 3B, a smart phone 31 displays the current master and slave relationship between the terminals (the smart phone 31 is the master device and the smart phone 32 is the slave device). When the user clicks a switching button 33, the smart phone 31 receives a state switching request (for switching from the master device to the slave device). Upon receiving the state switching request, the smart phone 31 sends corresponding state switching signal (master-slave switching signal) to the IC in the interface circuit. Accordingly, the IC receives the state switching signal.

In step 302, when the state switching signal indicates that the interface circuit is in the master-slave switching state, the second identity pin ID2 is disconnected with the first configuration channel pin CC1, the second identity pin ID2 is set to high level and the first configuration channel pin CC1 is set to low level by the IC.

When the received state switching signal indicates that the interface circuit is in the master-slave switching state, the IC knows that it needs to switch the current device from the master device to the slave device, that is to say, to disconnect the ID2 and the CC1 and configure the levels of the ID2 pin and the CC1 pin, respectively.

Under the master-slave switching state, the IC sets the ID2 to high level and the CC1 to low level. At the same time, the ID of the PMIC which is connected with the ID2 receives the high level signal and knows the current device is the salve device; the CC2 of the USB interface which is connected with the CC1 receives the low level signal of the CC1 and sends it to another terminal through the connection line. Because the CC pin and the ID pin of the another terminal are connected, the PMIC of the another terminal can receive the low level signal and know the current device is the master device.

In step 303, when the state switching signal indicates that the interface circuit is in the slave-master switching state, the second identity pin ID2 is disconnected with the first configuration channel pin CC1, the second identity pin ID2 is set to low level and the first configuration channel pin CC1 is set to high level by the IC.

When the received state switching signal indicates that the interface circuit is in the slave-master switching state, the IC knows that it needs to switch the current device from the slave device to the master device, that is to say, to disconnect the ID2 and the CC and configure the levels of the ID2 pin and the CC1 pin, respectively.

Under the slave-master switching state, the IC sets the ID2 to low level and the CC1 to high level. At the same time, the ID1 of the PMIC which is connected with the ID2 receives the low level signal and knows the current device is the master device; the CC2 of the USB interface which is connected with the CC1 receives the high level signal of the CC1 and sends it to another terminal through the connection line. Because the CC pin and the ID pin of the another terminal are connected, the PMIC of the another terminal can receive the high level signal and know the current device is the slave device.

Through the above steps 302 or 303, the levels of the ID pins in the respective PMICs of the two terminals have changed. When the level of the ID pin changes from low to high, the terminal switches from the master device to the slave device, and when the level of the ID pin changes from high to low, the terminal switches from the slave device to the master device.

In step 304, the second identity pin ID2 is connected with the first configuration channel pin CC1 by the IC upon completing the switching according to the state switching signal.

Upon completing the switching according to the state switching signal, the IC connects the ID2 and the CC1, therefore, the level of the CC1 is the same as the level of the ID2. The terminals connected with the connection line identify each other the level of the ID pin in the PMIC of the opposite terminal, so that they can determine the master and slave relationship between the terminals.

As shown in FIG. 3B, before switching the master and slave states, the smart phone 31 is the master device, the smart phone 32 is the salve device, and the smart phone 31 charges the smart phone 32 through the connection line; after switching the master and slave states, the smart phone 31 changes to the slave device, the smart phone 32 changes to the master device, and the smart phone 32 charges the smart phone 31 through the connection line. It needs to be noted that before switching the master and slave states, the smart phone 31 can read/write data from/to the smart phone 32, while after switching the master and slave states, the smart phone 32 can read/write data from/to the smart phone 31.

In conclusion, the method for state switching provided in the embodiment may provide the following benefits: using an IC for switching master and slave states to achieve switching the master device and the slave device under different switching states by adding the IC between the PMIC and the USB interface as well as between the USB controller and the USB interface; solving the problem that the master and slave states of the two terminals are random and cannot be switched after connecting the two terminals with a connection line which is not good for data interaction between the terminals; achieving the effect that the interface circuit dynamically switches the master and slave states of the terminals according to different switching states, thus improving the data interaction efficiency between the terminals.

Figure 3C:
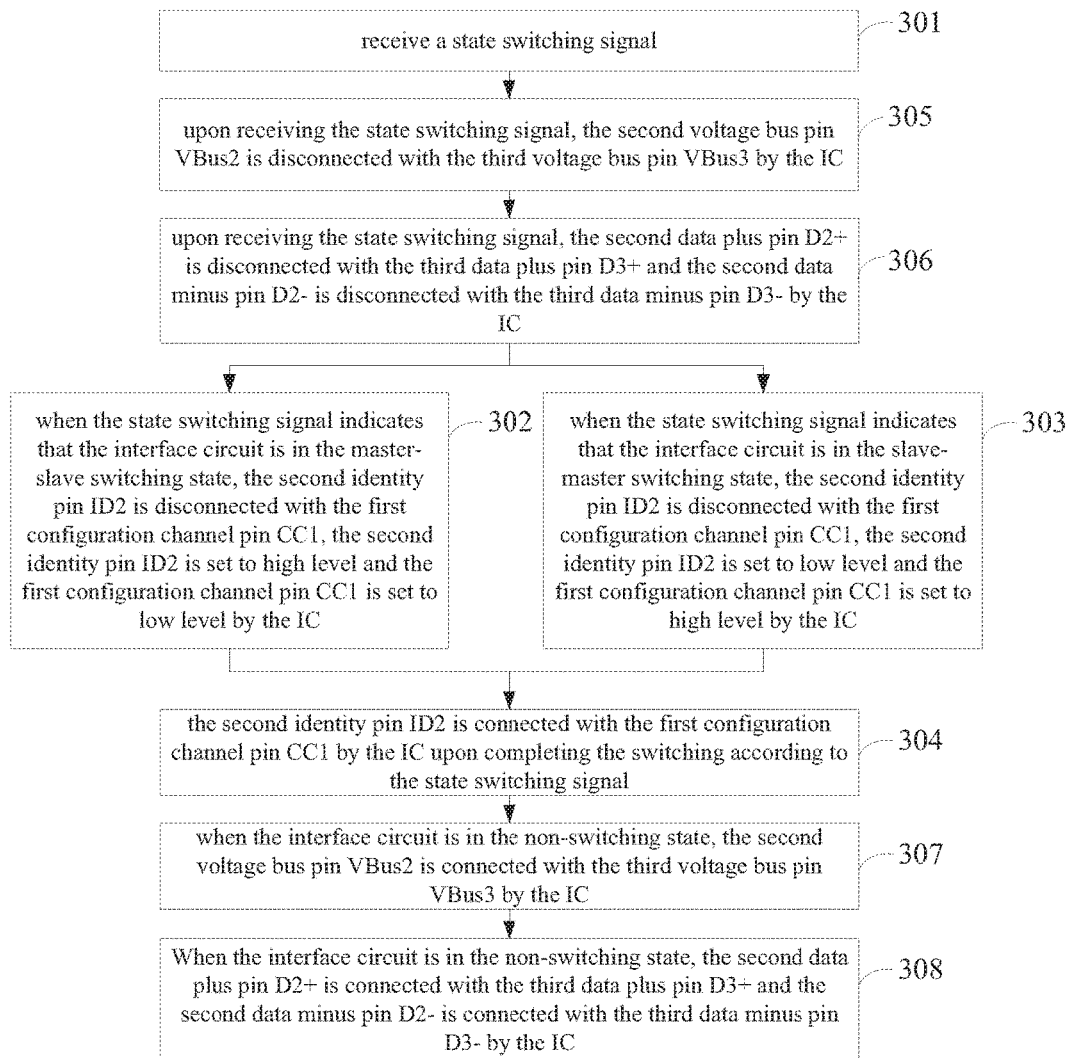
FIG. 3C is a method flowchart of a method for state switching, according to another exemplary embodiment.

Because after state switching, the master and slave states of the terminals will change, leading to a change in the direction of power or data transfer between the terminals. In order to avoid a waste in the power transfer or an exception in the data transfer, the method alternatively includes the following steps, as shown in FIG. 3C.

In step 305, upon receiving the state switching signal, the second voltage bus pin VBus2 is disconnected with the third voltage bus pin VBus3 by the IC.

Under the default state, the VBus2 and the VBus3 in the IC are connected, so that the terminal can transfer power with the connected terminal through the connection line, wherein the default state refers to non-switching state or switching-completed state. Traditionally, in the connected two terminals, the master device charges the slave device.

After state switching, the original master device changes to the slave device while the original slave device changes to the master device, leading to a change in the direction of the charge, therefore, upon receiving the state switching signal, the interface circuit disconnects the VBus2 and the VBus3 by the IC, thus preventing the power transfer between the terminals.

In step 306, upon receiving the state switching signal, the second data plus pin D2+ is disconnected with the third data plus pin D3+ and the second data-pin D2− is disconnected with the third data-pin D3− by the IC.

Under the default state, the D2+ and the D3+ in the IC are connected and the D2− and the D2− are connected, so that the master device in the connected two terminals can read/write data from/to the slave device through the connection line, wherein the default state refers to non-switching state or switching-completed state. Because only the master device can read data from the slave device, and the original master device changes to the slave device while the original slave device changes to the master device after state switching, it is prone to cause data transfer exception if the data is transferred during the switching state. Therefore, upon receiving the state switching signal, the interface circuit can prevent transferring data under the switching state by disconnecting the D2+ and the D3+ and disconnecting the D2− and the D2− by the IC.

Accordingly, in order to recover the data transfer or the power transfer between the terminals after the state switching, the method alternatively includes the following steps, as shown in FIG. 3C.

In step 307, when the interface circuit is in the non-switching state, the second voltage bus pin VBus2 is connected with the third voltage bus pin VBus3 by the IC.

Upon completing the state switching, in order to ensure the normal power transfer, the IC in the interface circuit connects the VBus2 and the VBus3, so that the VBus1 of the PMIC is connected with the VBus4 of the USB interface, leading to the normal power transfer between the terminals.

In step 308, when the interface circuit is in the non-switching state, the second data plus pin D2+ is connected with the third data plus pin D3+ and the second data-pin D2− is connected with the third data-pin D3− by the IC.

Similar to the step 307, upon completing the state switching, in order to ensure the normal data transfer, the IC in the interface circuit connects the D2+ and the D3+ and connects the D2− and the D3−, so that the D1+ of the USB controller is connected with the D4+ of the USB interface and the D1− of the USB controller is connected with the D4− of the USB interface, leading to the normal data transfer between the terminals.

Figure 4:
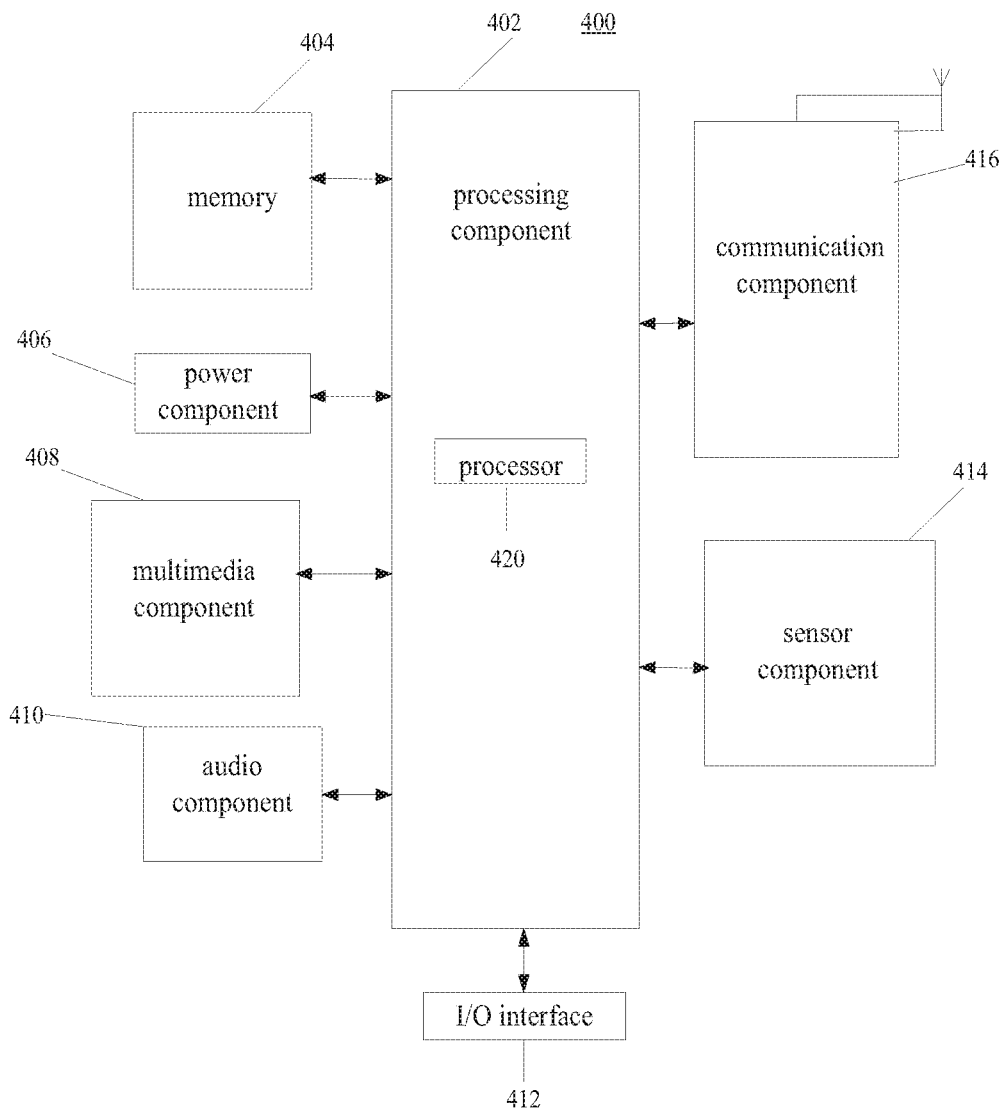
FIG. 4 is a block diagram of a device for state switching, according to an exemplary embodiment.

FIG. 4 is a block diagram illustating a state switching device 400, according to an exemplary embodiment. For example, the device 400 may be a terminal installed with an interface circuit as shown in FIG. 2. The terminal may be a smart phone, a tablet computer, an ebook reader, and the like.

Referring to FIG. 4, the device 400 may include one or more of the following components: a processing component 402, a memory 404, a power component 406, a multimedia component 408, an audio component 410, an input/output (I/O) interface 412, a sensor component 414, and a communication component 416.

The processing component 402 typically controls overall operations of the device 400, such as the operations associated with display, telephone calls, data communications, camera operations, and recording operations. The processing component 402 may include one or more processors 420 to execute instructions to perform all or part of the steps in the above described methods. Moreover, the processing component 402 may include one or more modules which facilitate the interaction between the processing component 402 and other components. For instance, the processing component 402 may include a multimedia module to facilitate the interaction between the multimedia component 408 and the processing component 402. In embodiments, the processor 420 is connected with the control pin of the IC in the interface circuit, to receive the state switching requests and send corresponding state switching signals to the IC in the interface circuit through the control pin according to the state switching requests.

The memory 404 is configured to store various types of data to support the operation of the device 400. Examples of such data include instructions for any applications or methods operated on the device 400, contact data, phonebook data, messages, pictures, video, etc. The memory 404 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 406 provides power to various components of the device 400. The power component 406 may include a power management system, one or more power sources, and any other components associated with the generation, management, and distribution of power in the device 400. In embodiments, the power component 406 is electrically connected with the PMIC in the interface circuit.

The multimedia component 408 includes a screen providing an output interface between the device 400 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 408 includes a front camera and/or a rear camera. The front camera and the rear camera may receive an external multimedia datum while the device 400 is in an operation mode, such as a photographing mode or a video mode. Each of the front camera and the rear camera may be a fixed optical lens system or have focus and optical zoom capability.

The audio component 410 is configured to output and/or input audio signals. For example, the audio component 410 includes a microphone ("MIC") configured to receive an external audio signal when the device 400 is in an operation mode, such as a call mode, a recording mode, and a voice recognition mode. The received audio signal may be further stored in the memory 404 or transmitted via the communication component 416. In some embodiments, the audio component 410 further includes a speaker to output audio signals.

The I/O interface 412 provides an interface between the processing component 402 and peripheral interface modules, such as a keyboard, a click wheel, buttons, and the like. The buttons may include, but are not limited to, a home button, a volume button, a starting button, and a locking button. In embodiments, the I/O interface 412 may be the USB interface.

The sensor component 414 includes one or more sensors to provide status assessments of various aspects of the device 400. For instance, the sensor component 414 may detect an open/closed status of the device 400, relative positioning of components, e.g., the display and the keypad, of the device 400, a change in position of the device 400 or a component of the device 400, a presence or absence of user contact with the device 400, an orientation or an acceleration/deceleration of the device 400, and a change in temperature of the device 400. The sensor component 414 may include a proximity sensor configured to detect the presence of nearby objects without any physical contact. The sensor component 414 may also include a light sensor, such as a CMOS or CCD image sensor, for use in imaging applications. In some embodiments, the sensor component 414 may also include an accelerometer sensor, a gyroscope sensor, a magnetic sensor, a pressure sensor, or a temperature sensor.

The communication component 416 is configured to facilitate communication, wired or wirelessly, between the device 400 and other devices. The device 400 can access a wireless network based on a communication standard, such as WiFi, 2G, or 3G, or a combination thereof. In one exemplary embodiment, the communication component 416 receives a broadcast signal or broadcast associated information from an external broadcast management system via a broadcast channel. In one exemplary embodiment, the communication component 416 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 400 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 404, executable by the processor 420 in the device 400, for performing the above-described methods. For example, the non-transitory computer-readable storage medium may be a ROM, a RAM, a CD-ROM, a magnetic tape, a floppy disc, an optical data storage device, and the like.

A non-transitory computer-readable storage medium having stored therein instructions that, when executed by a processor of the device 400, causes the device 400 to perform the following operations: receiving a request for state switching; sending a state switching signal to an IC in an interface circuit through a control pin according to the request for state switching; the interface circuit is configured to disconnect a second identity pin ID2 with a first configuration channel pin CC1 and set the second identity pin ID2 to high level and the first configuration channel pin CC to low level by the IC when the state switching signal indicates that the interface circuit is in a master-slave switching state; the interface circuit is further configured to disconnect the second identity pin ID2 with the first configuration channel pin CC1 and set the second identity pin ID2 to low level and the first configuration channel pin CC1 to high level by the IC when the state switching signal indicates that the interface circuit is in a slave-master switching state; the interface circuit is further configured to connect the second identity pin ID2 with the first configuration channel pin CC by the IC upon completing the switching according to the state switching signal.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. An interface circuit, comprising a Power Management Integrated Circuit (PMIC), a Universal Serial Bus (USB) controller, an Integrated Circuit (IC) and a USB interface, wherein a first identity pin (ID1) of the PMIC is connected with a second identity pin (ID2) of the IC, and a first configuration channel pin (CC1) of the IC is connected with a second configuration channel pin (CC2) in the USB interface;

a data pin in the USB controller is connected with a data pin in the USB interface through the IC;

under a master-slave switching state, the IC disconnects the second identity pin (ID2) with the first configuration channel pin (CC1), and sets the second identity pin (ID2) to high level and the first configuration channel pin (CC1) to low level;

under a slave-master switching state, the IC disconnects the second identity pin (ID2) with the first configuration channel pin (CC1), and sets the second identity pin (ID2) to low level and the first configuration channel pin (CC1) to high level;

under a non-switching state, the IC is in a state that the second identity pin (ID2) is connected with the first configuration channel pin (CC1).

2. The interface circuit of claim 1, wherein a first voltage bus pin (VBus1) of the PMIC is connected with a second voltage bus pin (VBus2) of the IC, and a third voltage bus pin (VBus3) of the IC is connected with a fourth voltage bus pin (VBus4) of the USB interface;

under the master-slave switching state or the slave-master switching state, the IC disconnects the second voltage bus pin (VBus2) with the third voltage bus pin (VBus3);

under the non-switching state, the IC is in a state that the second voltage bus pin (VBus2) is connected with the third voltage bus pin (VBus3).

3. The interface circuit of claim 1, wherein a first data plus pin (D1+) of the USB controller is connected with a second data plus pin (D2+) of the IC, and a third data plus pin (D3+) of the IC is connected with a fourth data plus pin (D4+) of the USB interface;

a first data minus pin (D1−) of the USB controller is connected with a second data minus pin (D2−) of the IC, and a third data minus pin (D3−) of the IC is connected with a fourth data minus pin (D4−) of the USB interface;

under the master-slave switching state or the slave-master switching state, the IC disconnects the second data plus pin (D2+) with the third data plus pin (D3+), and disconnects the second data minus pin (D2−) with the third data minus pin (D3−);

under the non-switching state, the IC is in a state that the second data plus pin (D2+) is connected with the third data plus pin (D3+), and the second data minus pin (D2−) is connected with the third data minus pin (D3−).

4. The interface circuit of claim 1, wherein
the IC further comprises a control pin to receive a state switching signal indicating that the IC is in the master-slave switching state or the slave-master switching state.

5. A terminal installed with the interface circuit of claim 1.

6. A method for state switching to be used in an interface circuit comprising a Power Management Integrated Circuit (PMIC), a Universal Serial Bus (USB) controller, an Integrated Circuit (IC) and a USB interface, wherein
a first identity pin (ID1) of the PMIC is connected with a second identity pin (ID2) of the IC, and a first configuration channel pin (CC1) of the IC is connected with a second configuration channel pin (CC2) in the USB interface;
a data pin in the USB controller is connected with a data pin in the USB interface through the IC;
under a master-slave switching state, the IC disconnects the second identity pin (ID2) with the first configuration channel pin (CC1), and sets the second identity pin (ID2) to high level and the first configuration channel pin (CC1) to low level;
under a slave-master switching state, the IC disconnects the second identity pin (ID2) with the first configuration channel pin (CC1), and sets the second identity pin (ID2) to low level and the first configuration channel pin (CC1) to high level;
under a non-switching state, the IC is in a state that the second identity pin (ID2) is connected with the first configuration channel pin (CC1), and
wherein the method comprises:
receiving a state switching signal;
when the state switching signal indicates that the interface circuit is in the master-slave switching state, disconnecting the second identity pin (ID2) with the first configuration channel pin (CC1) and setting the second identity pin (ID2) to high level and the first configuration channel pin (CC1) to low level by the IC;
when the state switching signal indicates that the interface circuit is in the slave-master switching state, disconnecting the second identity pin (ID2) with the first configuration channel pin (CC1) and setting the second identity pin (ID2) to low level and the first configuration channel pin (CC1) to high level by the IC;
connecting the second identity pin (ID2) with the first configuration channel pin (CC1) by the IC upon completing the switching according to the state switching signal.

7. The method of claim 6, further comprising:
disconnecting the second voltage bus pin (VBus2) with the third voltage bus pin (VBus3) by the IC upon receiving the state switching signal.

8. The method of claim 7, further comprising:
when the interface circuit is in the non-switching state, connecting the second voltage bus pin (VBus2) with the third voltage bus pin (VBus3) by the IC.

9. The method of claim 6, wherein
a first data plus pin (D1+) of the USB controller is connected with a second data plus pin (D2+) of the IC, and a third data plus pin (D3+) of the IC is connected with a fourth data plus pin (D4+) of the USB interface;
a first data minus pin (D1−) of the USB controller is connected with a second data minus pin (D2−) of the IC, and a third data minus pin (D3−) of the IC is connected with a fourth data minus pin (D4−) of the USB interface;
under the master-slave switching state or the slave-master switching state, the IC disconnects the second data plus pin (D2+) with the third data plus pin (D3+), and disconnects the second data minus pin (D2−) with the third data minus pin (D3−);
under the non-switching state, the IC is in a state that the second data plus pin (D2+) is connected with the third data plus pin (D3+), and the second data minus pin (D2−) is connected with the third data minus pin (D3−),
wherein the method further comprises:
disconnecting the second data plus pin (D2+) with the third data plus pin (D3+) and disconnecting the second data minus pin (D2−) with the third data minus pin (D3−) by the IC upon receiving the state switching signal.

10. The method of claim 9, further comprising:
when the interface circuit is in the non-switching state, connecting the second data plus pin (D2+) with the third data plus pin (D3+) and connecting the second data minus pin (D2−) with the third data minus pin (D3−) by the IC.

11. A device for state switching comprising:
an interface circuit including a Power Management Integrated Circuit (PMIC), a Universal Serial Bus (USB) controller, an Integrated Circuit (IC) and a USB interface, wherein
a first identity pin (ID1) of the PMIC is connected with a second identity pin (ID2) of the IC, and a first configuration channel pin (CC1) of the IC is connected with a second configuration channel pin (CC2) in the USB interface;
a data pin in the USB controller is connected with a data pin in the USB interface through the IC;
under a master-slave switching state, the IC disconnects the second identity pin (ID2) with the first configuration channel pin (CC1), and sets the second identity pin (ID2) to high level and the first configuration channel pin (CC1) to low level;
under a slave-master switching state, the IC disconnects the second identity pin (ID2) with the first configuration channel pin (CC1), and sets the second identity pin (ID2) to low level and the first configuration channel pin (CC1) to high level;
under a non-switching state, the IC is in a state that the second identity pin (ID2) is connected with the first configuration channel pin (CC1), the IC further comprises a control pin to receive a state switching signal indicating that the IC is in the master-slave switching state or the slave-master switching state, wherein the device further comprises:
- a processor connected with the control pin of the IC in the interface circuit;
- a memory for storing instructions executable by the processor, wherein
- the processor is configured to receive a request for state switching, and send a state switching signal to the IC in the interface circuit through the control pin according to the request for state switching;
- the interface circuit is configured to disconnect the second identity pin (ID2) with the first configuration channel pin (CC1) and set the second identity pin (ID2) to high level and the first configuration channel pin (CC1) to low level by the IC when the state switching signal indicates that the interface circuit is in the master-slave switching state;
- the interface circuit is further configured to disconnect the second identity pin (ID2) with the first configuration channel pin (CC1) and set the second identity pin (ID2) to low level and the first configuration channel pin (CC1) to high level by the IC when the state switching signal indicates that the interface circuit is in the slave-master switching state;
- the interface circuit is further configured to connect the second identity pin (ID2) with the first configuration channel pin (CC1) by the IC upon completing the switching according to the state switching signal.

* * * * *